C. GLOVER.
COASTER BRAKE.
APPLICATION FILED DEC. 18, 1908.
959,509.
Patented May 31, 1910.
3 SHEETS—SHEET 1.
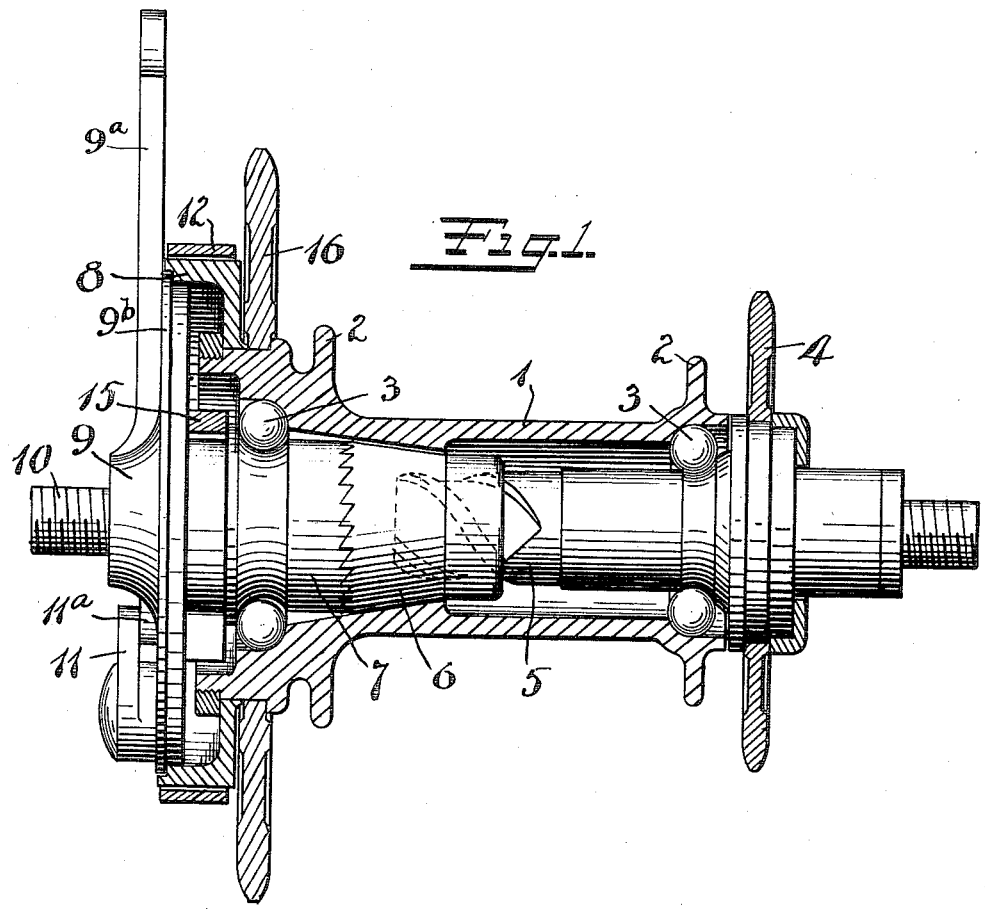
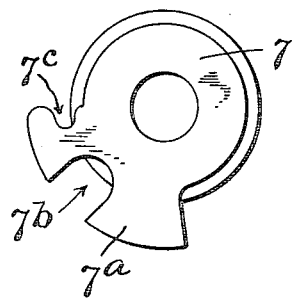
Witnesses:
Inventor
CHARLES GLOVER
By his Attorneys

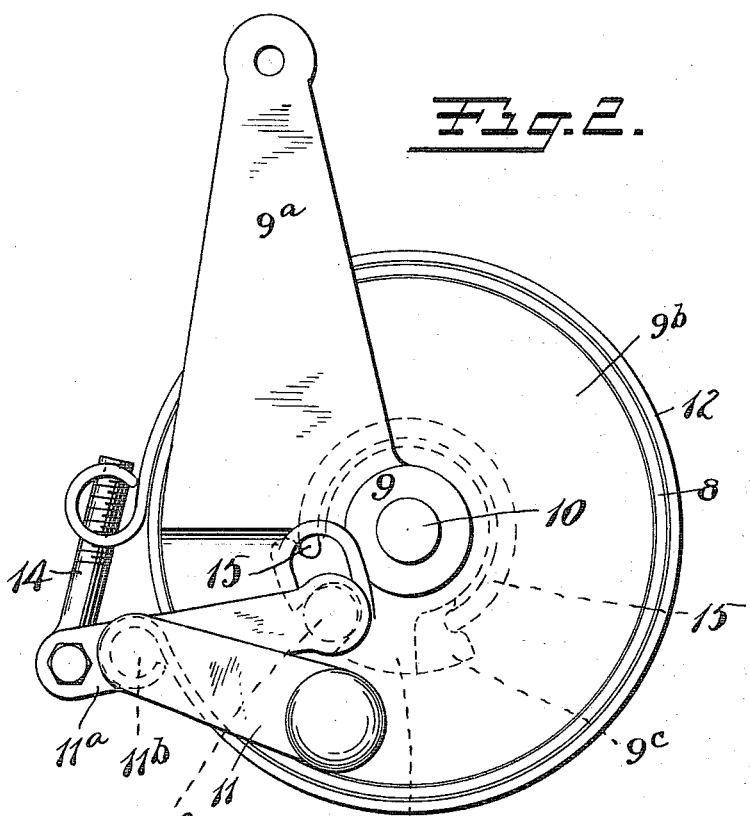
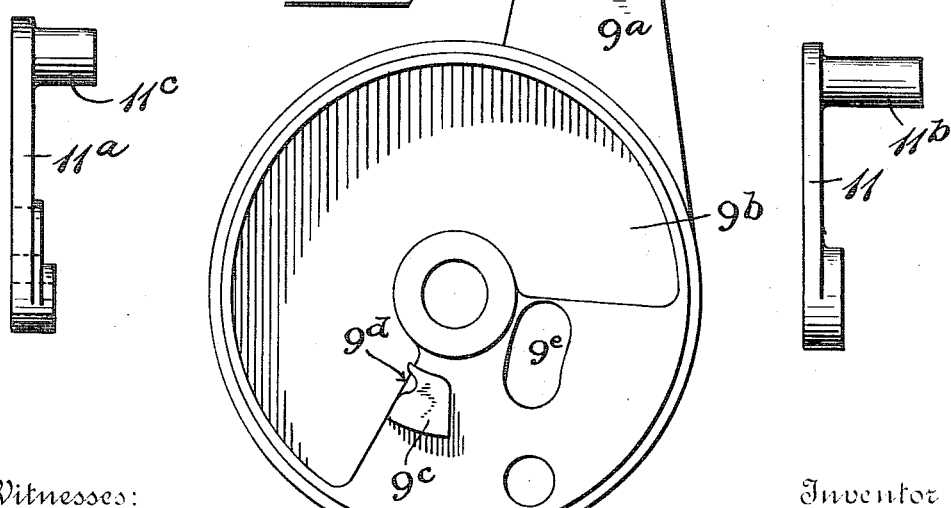

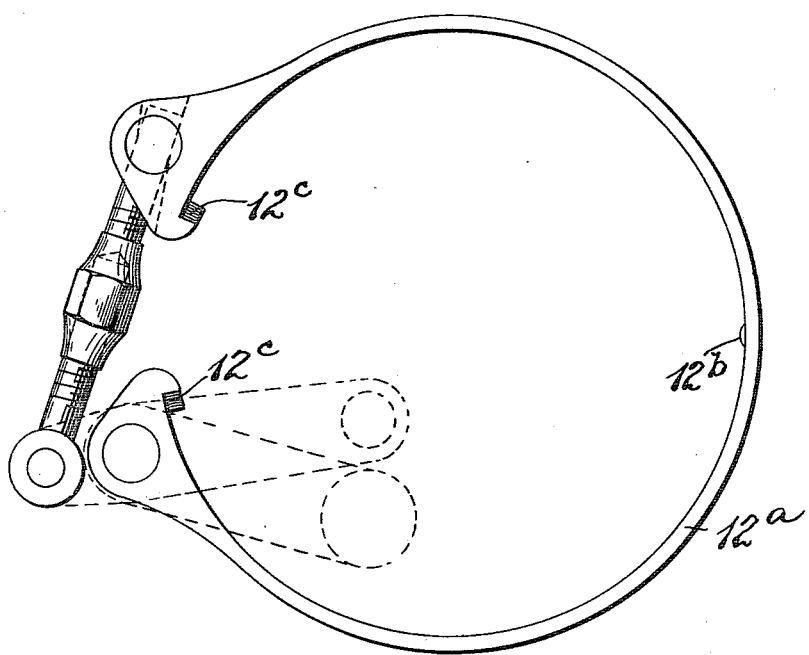
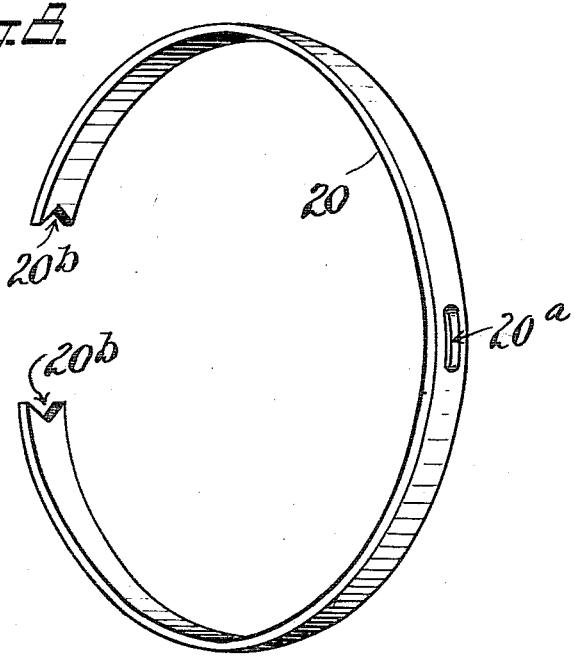

UNITED STATES PATENT OFFICE.

CHARLES GLOVER, OF NEW BRITAIN, CONNECTICUT.

COASTER-BRAKE.

959,509.   Specification of Letters Patent.   Patented May 31, 1910.

Application filed December 18, 1908. Serial No. 468,125.

*To all whom it may concern:*

Be it known that I, CHARLES GLOVER, a citizen of the United States, residing at New Britain, county of Hartford, State of Connecticut, have invented certain new and useful Improvements in Coaster - Brakes, of which the following is a full, clear, and exact description.

My invention relates to improvements in coaster hub brakes, the object being to provide a simple and effective brake-mechanism which will apply at the least expenditure of effort, a maximum braking power. The construction is such that the parts are easily accessible at all times for renewal or replacement in the event of breakage or wear.

Among the many advantages that my improvement contemplates are simplicity, durability and effectiveness. The construction is such that the same means is employed for driving the coaster hub at one time that is employed for setting the brake at another time.

The invention also provides a new form of brake lever arrangement; a new method of anchoring the brake levers to the brake arm and a new method of applying individual brake shoes to replace old ones.

These and other advantages will be apparent to those skilled in this art.

In the drawings, Figure 1 is a longitudinal sectional view through a coaster hub fitted with my improved brake, said figure showing certain parts in elevation. Fig. 2 is an end elevation of Fig. 1 viewed from left to right. Fig. 3 is a view of the inside of a detached detail. Figs. 4, 5 and 6 are respectively views of other details. Fig. 7 is a detail view illustrating a slight modification. Fig. 8 is a perspective view of another detail adapted to the modification of Fig. 7.

1 is the hub proper, having the usual spoke flanges 2—2.
3—3 are ball bearings.

4 is a sprocket, which I will term the driver. This driver 4 carries what I term a coupling actuator 5, which operates upon a coupling member 6 by means of the well known helical connection, indicated in dotted lines. As the driver 4 rotates ahead, the coupling 6 is drawn to the right, and, tapered externally so as to engage a correspondingly internally tapered face on the hub 1, it couples the driver 4 with said hub, so that said parts 1 and 4 will turn together.

When, however, the rotation of the driver 4 is reversed, as by "back-pedaling," this movement shifts the coupling 6 to the left, as viewed in Fig. 1, freeing it from the hub 1 and engaging it in any suitable manner (as by teeth) with the brake actuator 7. The outer end of this brake-actuator 7 is suitably shaped so as to operate the brake levers. An end view of the brake actuator is shown in its preferred form in Fig. 6, and the same will be seen to have a lateral offset portion $7^a$ notched at $7^b$, and also notched at $7^c$, the purpose of said notches being later described.

Fixed on the outer end of the wheel hub 1 is a brake drum 8.

9 is what I term a stationary abutment fixed upon the central arbor 10, which passes entirely through the apparatus and by the ends of which the apparatus is secured to the desired vehicle frame. This abutment 9 may have a side arm $9^a$ arranged to be secured to a stationary part of the frame, the better to hold it against displacement. This abutment 9 also has a cover plate $9^b$ which closes in the otherwise open side or end of the brake drum 8. On the back of this cover plate $9^b$ is a projection $9^c$ notched at $9^d$, for the purpose hereinafter described. In the side of said cover plate $9^b$ is an opening $9^e$.

11 is a lever hinged to the outer side of plate $9^b$.

$11^a$ is a toggle having a stud $11^c$ projecting through the passage or opening $9^e$, so as to stand in the notch cr recess $7^b$ of the brake actuator. One end of the lever 11 is pivotally connected at $11^b$ to the toggle $11^a$ between its ends.

12 is a strap brake surrounding the brake drum 8 and connected at one end to the toggle $11^a$ preferably at a point coincident with the stud $11^b$, while the other end of said brake strap 12 is connected to the outer end of the toggle $11^a$, as by an adjustable link 14.

15 is a return spring, preferably C-shaped, one end of which stands in the notch $9^d$ of the projection $9^c$, while the other end stands in the notch $7^c$ of the brake actuator.

The tendency of the spring 15 is to return the brake actuator to its normal inactive position, in which the rear end of the offset $7^a$ bears against the rear of the projection $9^c$, as indicated in dotted lines in Fig. 2.

From the foregoing it follows that when the driver 4 is rotated in a reverse direction, or "back-pedaled" it will impart rearward motion to the brake actuator 7, which in turn, through its connection with the toggle 11ᵃ, will swing the same in such a direction as to draw the ends of the brake band 12 down upon the brake drum 8, applying the necessary drag or braking action thereto, which, by reason of the location of the brake strap, operates with a maximum of efficiency.

In the drawings as shown, 16 is a second driving sprocket such as would be employed where the hub is used for a motor vehicle, the mechanical motive power being transmitted to said hub through said sprocket 16. Obviously, if this power is delivered at such a speed as to overrun the coupling 6, (assuming that the driver 4 has been and is being advanced) the effect of said excess speed will be simply to shift said coupling to the left, as viewed in Fig. 1, in which position it is ready to operate the brake-actuator 7, should there be any occasion to apply a drag, at which time the operator needs but to reverse or "back-pedal" the driver 4. All of the parts as thus far described are well protected from dust and dirt, and may be easily assembled or dismembered for any desired purpose.

In Figs. 7 and 8 I have shown a slight modification in which the brake band is indicated at 12ᵃ, the same being so arranged as to carry a removable brake shoe 20, one form of which is shown in Fig. 8. In this modification, the brake band is provided with a projection 12ᵇ arranged to engage in a notch or recess 20ᵃ in the brake shoe to prevent side displacement. The brake band 12ᵃ also may have the beveled end projections 12ᶜ arranged to engage in notches 20ᵇ at the ends of the shoe 20, thus holding the extremities of the brake shoe against end and side displacement. Otherwise the construction of Fig. 7 is the full equivalent of the form previously described.

What I claim is:

1. In a coaster hub, a hub proper, a brake therefor comprising a brake drum carried by the hub, a brake strap located externally of said drum, actuating means for said brake strap arranged within said drum, means of connection between the actuator within the drum and the strap external of the drum, including toggle levers.

2. In a coaster hub, a hub proper, a brake therefor comprising a brake drum carried by the hub, a strap brake located externally of said drum, an actuator for said strap brake arranged within said drum, a cover and protecting member for the latter, and operative means of connection between the actuator and strap brake passing through said cover member.

3. In a coaster hub, a hub proper, a brake therefor comprising a brake drum carried by the hub, a stationary abutment, a lever carried by the latter, a brake strap connected with said lever and arranged externally of the drum, and an actuator within the drum and operatively connected with said lever.

4. In a coaster hub, a hub proper, a brake drum, a strap brake surrounding the same and normally free thereof, toggle levers connected to said strap brake, a relatively stationary abutment for supporting and holding said toggle levers, an oscillating actuator and means for operatively connecting the actuator with said toggle levers, a driver, and means for coupling and uncoupling said driver with said hub or said actuator, respectively, by a forward motion of said actuator on the one hand, or a reverse motion of said driver on the other hand.

5. In a coaster hub, a hub proper, a brake drum, a strap brake surrounding the same and normally free thereof, toggle levers connected to said strap brake, a relatively stationary abutment for supporting and holding said toggle levers, an oscillating actuator concentric with said hub, and means for operatively connecting the actuator with said toggle levers, a driver, and means for coupling and uncoupling said driver with said hub or said actuator, respectively, by a forward motion of said actuator on the one hand or a reverse motion of said driver on the other hand.

6. In a coaster hub, a hub proper, a brake drum carried thereby, a brake strap, surrounding said drum but normally free thereof, a lever mounted externally of the drum for actuating said brake strap, a brake actuator within said hub, said actuator and brake operating lever being connected, an abutment for the support of said brake actuating lever, and a single means for applying power and motion to said hub at one time and to said brake actuating lever at another time, said means having an intermediate position where the hub is free therefrom and the brake strap is free from said drum.

7. In a coaster hub, a hub proper, a brake drum carried thereby, a brake strap surrounding said drum but normally free thereof, a lever mounted externally of the drum for actuating said brake strap, a brake actuator within said hub and concentric therewith, said actuator and brake operating lever being connected, an abutment for the support of said brake actuating lever, and a single means for applying power and motion to said hub at one time and to said brake actuating lever at another time, said means having an intermediate position where the hub is free therefrom and the brake strap is free from said drum.

8. In a coaster hub, a hub proper, a brake drum carried thereby, an external contractible brake strap surrounding said drum, a removable brake shoe carried by said strap and adjacent to said drum, interlocking means within the strap for detachably holding said brake shoe to said strap and means for operating said strap through the interior of said drum.

9. In a coaster brake, a hub, a drum carried thereby, a brake band mounted around said drum but normally free therefrom, a support for said brake band arranged externally of the drum, a brake actuating device, means for operatively connecting said actuating device with both ends of said brake band and including a lever extending partially outside of said drum and partially inside of said drum, and operative means of connection between the inner end of said lever and said brake actuating device.

10. A coaster brake including a drum, a contractible brake band operating upon the periphery of said drum, a support outside of said drum for said band, and means for operatively engaging and shifting both ends of the brake band when the brake is to be applied, said means actuating through the interior of said drum.

11. A coaster brake including a drum, a contractible brake band arranged to operate on the periphery of said drum, a support outside of the periphery of said drum for said band, an operating device located within the drum, and means including a lever operatively connected with said operating means and both ends of said brake band to contract said band.

CHARLES GLOVER.

Witnesses:
Geo. P. Spear,
S. C. Murphy.